INVENTOR.
HOWARD B. LOVERING
BY
Kenway, Jenney + Hildreth
ATTORNEYS

Nov. 17, 1970     H. B. LOVERING     3,540,831

INDICIUM LOCATING APPARATUS

Filed June 1, 1966     5 Sheets-Sheet 4

INVENTOR.
HOWARD B. LOVERING
BY
Kenway, Jenney + Hildreth
ATTORNEYS

INVENTOR.
HOWARD B. LOVERING
BY
Kinney, Tenney + Hildreth
ATTORNEYS

United States Patent Office 3,540,831
Patented Nov. 17, 1970

3,540,831
INDICIUM LOCATING APPARATUS
Howard B. Lovering, Bedford, Mass., assignor to GCA Corporation, Bedford, Mass., a corporation of Delaware
Filed June 1, 1966, Ser. No. 554,553
Int. Cl. G01b 11/00
U.S. Cl. 356—162                                8 Claims

ABSTRACT OF THE DISCLOSURE

Optical apparatus for locating an indicium at the center of an aperture in two coordinates, in which an image of the indicium is oscillated across a slit by oscillating means for one coordinate; an image of the indicium is oscillated across a second slit by the same means for the other coordinate. Photocells receive the appearance of each image in its respective slit, and the electrical signals from the cells are used to form traces on an oscilloscope having a sweep circuit, there being two traces for each slit. The sweep is triggered each time the oscillation means reaches the maximum excursion on each side of the slits. The position of the traces on the oscilloscope depends on the position of the indicium in its aperture. If the indicium is moved so that the traces coincide, the indicium is then centered in its aperture.

---

This invention relates in general to apparatus for locating one indicium with respect to another, and in particular with apparatus by means of which, for locating purposes, an image is accurately positioned at the center of an indexing aperture.

There are certain areas of scientifc investigation in which it is found necessary to locate very accurately an indicium with respect to another indicium, or with respect to some fixed reference point. Such indicia may be a spectrum line, or a spectral image such as the image of a star on a photographic plate, or the separation of the metallic conducting strips which form a part of printed circuit boards. The accuracy required in the locating of spectral lines and particularly of stellar images, in reference to other lines or stellar images, is in the order of a fraction of a micron. Also, in the measurement of stellar images, a two coordinate locating system is required, in which the order of accuracy in each of the coordinates is of the magnitude given above. An additional problem arises in view of the fact that in stellar photographic plates, the stellar images may range from 20 microns to 50 microns in size, and many times are very faint.

Another requirement of such measuring devices is that of being able to determine the density of the spectral image of spectrum line.

Therefore, there is a need for such an apparatus which will provide such measurements of the required accuracy, and the operation of which can be made at least semi-automatic, with the apparatus providing both visual and electrical outputs which may be inspected visually and can be fed into a computer.

There have been several solutions or attempts therefor, in regard to the above problem. In general, these solutions can be broken down into two classes. The first of these is the kind of instrument in which the location of images is done by means of a microscope to read the lines themselves, the microscope being carried on accurately formed lead screw ways in two coordinates, or the microscope can be fixed in position and the photographic plate film containing the spectrum lines or the stellar images may be traversed across the objective lens of the microscope. The other method, particularly as exemplified in the Caldecourt et al. U.S. Pat. 2,764,909, uses a method of scanning an image of the indicium to be located rapidly across a slit. The scanning method is rapid, and it yields an electrical output suitable for either being read out visually, or electrically. However, such methods as hitherto known may be inaccurate in that they depend, for an indication of centering of the spectral image in reference to the center of the slit, upon manipulating the indicium of the slit until the display from the apparatus has moved to a given position on the display apparatus itself, this position having previously been calibrated to be the center of the slit.

The present invention concerns itself with an improvement over the aforesaid scanning methods, and adopts scanning as one of its fundamental elements because of the aforementioned rapidity of use and because of the possibility of getting a satisfactory electrical read-out from the apparatus. However, this invention improves the prior methods to make the locating of the indicium more precise, and independent of the exact position that the displays shown thereby have in reference to the display screen itself. In addition, in one embodiment of the invention, there is provided apparatus for determining the location of an indicium in two coordinates. In another embodiment location is done in a single coordinate system.

Therefore, among the several objects and provisions of the invention may be noted the provision of an apparatus providing improved means for locating an indicium with reference to the center of an aperture; a provision of apparatus of the above class in which a visual indication of centering is provided; the provision of apparatus of either of the above classes which provides an electrical output which is adapted to be used by servomechanisms to obtain automatic operation and read-out of indicium location; the provision of apparatus which has a high degree of accuracy, measured in terms of fractions of a micron; the provision of apparatus of any of the above classes which is rapid in operation and simple to use; the provision of apparatus of above classes using scanning means in which the accuracy of the position-finding function is relatively independent of the scan frequency; the provision of apparatus of the above classes which in one form is suitable for single coordinate measurements, and in another form is suitable for either single or two coordinate measurements; and the provision of apparatus of any of the above classes which is simple to use and provides extreme accuracy. Other objects and advantages will be in part obvious and in part pointed out hereinafter.

The invention accordingly comprises the elements and combinations of elements, features of construction, arrangements of parts, and manipulation of the apparatus all of which will be exemplified in the structures hereinafter set forth, and the scope of the application of which will be indicated in the appended claims.

In the accompanying drawings, in which are shown two embodiments of the invention:

In the drawings, similar reference characters indicate corresponding parts. Since the drawings are schematic, relative sizes of the lenses, etc. are not illustrated, and the size of the respective slits and apertures, and indicia, have been exaggerated for clarity of illustration.

Figure 1:
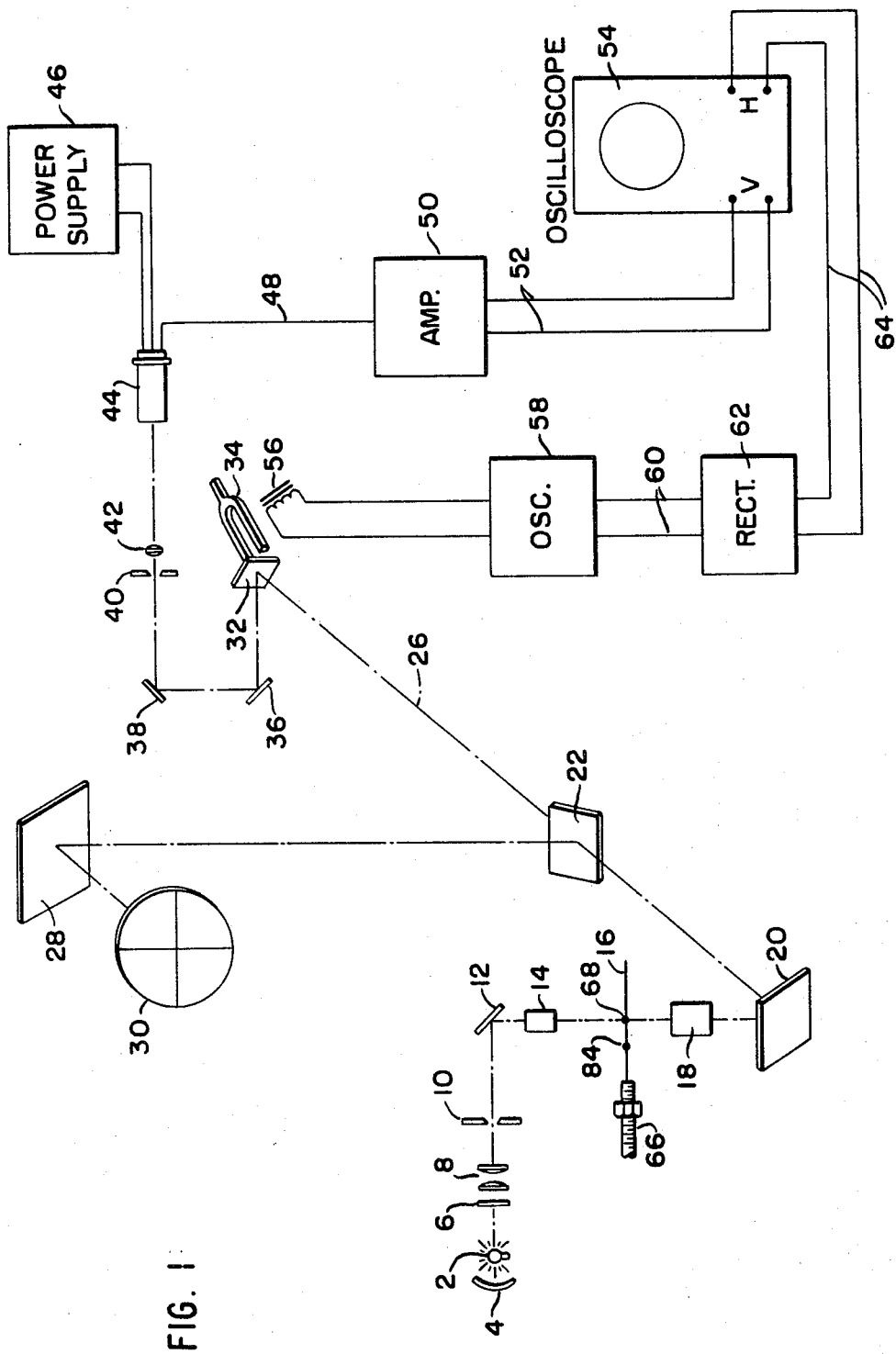
FIG. 1 is a schematic diagram of an optical system for a single coordinate locating apparatus, and the associated electrical apparatus.

Turning now to FIG. 1, for a description of the first embodiment, there is shown a schematic diagram of the optical system. An essential element of the device consists of a means for oscillating an image of the indicium to be located across an exit slit. The description of the apparatus will be set forth in terms of using an electrically driven tuning fork to one tine of which a plane mirror has been attached so that the mirror oscillates angularly at the fork frequency. When applied as a reflecting element in an image forming optical system, the mirror oscillation will cause the image of an indicium at the focal plane of the system to be displaced from its center position sinusoidially with respect to time. If a slit aperture is placed at this center position, and the light transmitted by the slit is received by a multiplier phototube, the output of the tube varies as a function of the transmission of the area of the image represented by the slit. The angular position of the mirror with respect to time is very accurately known because of the purity of the fundamental frequency of the tuning fork. Therefore, the position of a maximum or a minimum transmission area of the photographic material being imaged can be determined as a function of time.

In the embodiments to be described, a pulse is derived from the fork driving electronic system which is coincident with the extreme positions of the angular excursion of the mirror. This pulse is used to establish the phases of the two electrical signals produced by the phototube, one being produced each time the oscillated image traverses the aperture. When the center of excursion of the image is off-center with respect to the aperture, the phases of the signals are not equal, and the indicium is moved until the phases become equal, thus indicating that the center of excursion is at the center of the slit.

Where a display device such as a cathode-ray oscilloscope is used (as described for two of the embodiments) as a phase-comparator, the pulse is used to trigger the linear time base of an oscilloscope at each extreme position, the sweep occuring always in the same direction across the screen of the oscilloscope. The oscilloscope trace then displays the contour of the transmission through one half cycle of the mirror excursion. When the oscilloscope time base is triggered at the opposite extreme of mirror excursion, the oscilloscope trace represents the same output as before except that it is reversed, and is a mirror image of the first trace. Coincidence of the two traces can only be achieved when the line causing them is at an equal distance from both extremes of the scan amplitude, that is, when the line is centered in the aperture or slit. Another way of saying this is that when coincidence of the two traces is achieved, then the center of excursion of the scanned image is centered in the slit. This means, then, that if the oscillating means (the mirror) were at rest, the image of indicium would be exactly at the center of the slit.

Where the read-out of the phase difference is to be applied to an automatic centering servomechanism (as will be described for a third embodiment) the electrical signals from the phototube are fed to a phase synchronism detector which, in conjunction with the aforementioned pulse, will detect when the phases are the same. The servomechanism is responsive to the phase detector to move the indicium relative to the aperture until a null reading terminates operation of the servomechanism at the point that the image (if stationary, i.e., not being oscillated) is at the center of the aperture.

In FIG. 1, starting at the entrance end of the optical system and ending at the exit end, a light source 2 is shown of conventional nature, behind which is placed the spherical reflecting mirror 4. In conventional manner, a heat absorbing filter 6 is provided, the condensing lenses 8, and an entrance slit 10. From the entrance slit, light from the projection system thus described falls on the mirror 12 and thence through the projection lens 14 and onto the photographic film 16 which bears the spectrum line or star image which is to be located. From the film gate 16 light passes through the projection lens 18 and is thereafter reflected by the mirror 20 to the dichroic element 22. Dichroic element 22 splits the beam into two beams 24 and 26. The dichroic element used, for example, is one of several commercially available such that the reflected beam 24 therefrom lies in the yellow spectrum and the transmitted beam lies in the blue region. Beam 24 passes to the mirror 28 where it is focused, by suitable conventional projection means, not shown, onto the projection screen 30.

The light beam 26 which traverses the dichroic element 22 preferably falls in the blue region to which a photomultiplier tube (described below) has its maximum response. Beam 26 is reflected by mirror 32, to the two mirrors 36 and 38, and it is reflected by mirror 38 to exit slit 40.

On the other side of slit 40 is located a field lens 42 which focuses the slit onto the photomultiplier tube 44.

In this optical system, it is not necessary that the dichroic element 22 be used, since if it is not desired to have a visual trace of the indicium on a projection screen show, then the beam can pass directly from the mirror 20 to the mirror 32.

The photomultiplier tube is supplied by a conventional power supply 46, and the output of the photomultiplier tube passes by means of a connection 48 (the other connection being a common ground) to an amplifier 50, which is preferably one that has an input-output logarithmic relationship. The output of the amplifier is fed by means of leads 52 to an oscilloscope 54 which has vertical deflection means to which the leads 52 are connected as indicated by the letter V. The oscilloscope also has horizontal sweep deflection means to which connection may be made as indicated by the letter H.

Figure 2:
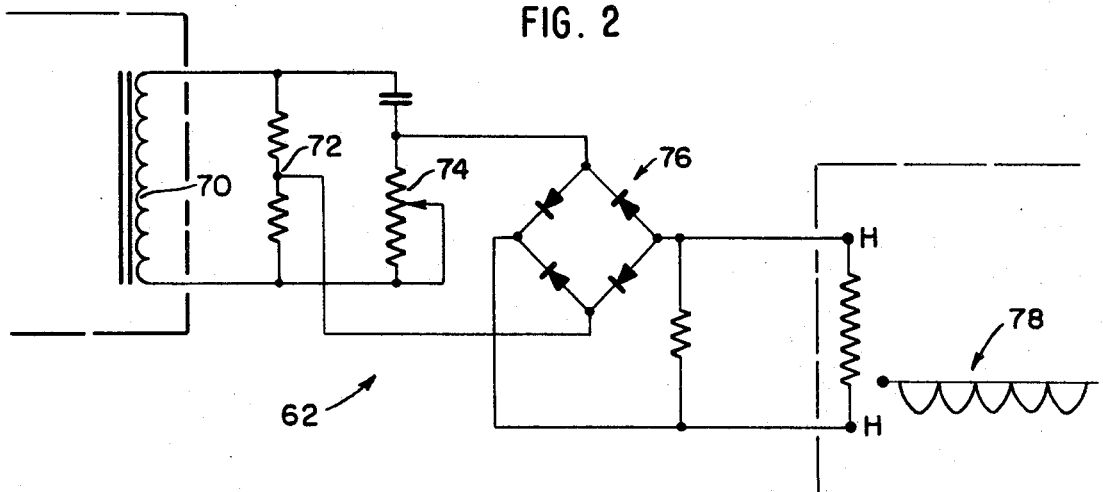
FIG. 2 is a schematic diagram of a triggering circuit used with the apparatus.

The tuning fork 34 is of conventional design and is driven by an electromagnetic driver 56. Driver 56 is in turn driven by an oscillator 58, and part of the circuit of the oscillator is tapped via leads 60 and fed to the full-wave rectifier 62. The output of the full-wave rectifier is connected by leads 64 to the horizontal sweep H. As shown in FIG. 2, in which is shown a schematic diagram of the circuit and output of the full-wave rectifier, the sweep circuit of the oscilloscope 54 is driven every half cycle of the tuning fork. That is, the sweep circuit is energized each time at the positions of maximum excursion of the tuning fork 34.

Schematically illustrated and indicated by numeral 66 is a lead-screw by means of which the film 16 may be moved to cause the image of the indicium 68 being located to move across the slit 40. Lead screw 66 may take one of several forms and is conventional, but it is critical for highest accuracy of the machine that the lead screw and its associated mechanical parts be of the utmost accuracy.

Schematically indicated by the dot 68 on the film 16 is an indicium which is being located. (Obviously, for purposes of clarity, the size of dot 68 in the drawing has been grossly exaggerated in respect to the size of the slit 40;

and the size of slit 40 has been obviously exaggerated in regard to the sizes illustrated of the various lenses, etc.)

As has been indicated above, the tuning fork 34 is conventional, and one that has been satisfactorily used is Class No. 1300 MF obtainable from Riverbank Laboratories, Geneva, Ill. The mirror 32 is fastened to the end of one tine of the tuning fork by conventional means. Its requirement is, of course, that it be relatively small and front surfaced, in order to keep its mass low and in order to avoid ghost images.

Referring to FIG. 2, there is shown a schematic diagram of the triggering circuit for the horizontal sweep of the oscilloscope 54. The circuit is conventional, but is given here since it is critical that the triggering of the horizontal sweep occur at each half cycle of the tuning fork vibration, and that the sweep always traverse in the same direction in the oscilloscope.

The output reference voltage from the oscillator 58 is fed to a transformer 70 and thence to a divider network 72. Across the divider network is placed a phase adjustment circuit 74, and the output of the divider network is fed to the full-wave rectifier bridge 76. Bridge 76 is conventional in nature and for compactness uses diodes as the bridge element. The output of the network 76 is fed to the horizontal sweep terminals H. Across the terminals H, as an example, should appear a rectified voltage of approximately 1.5 peak to peak voltage. The output of the triggering circuit is illustrated schematically by numeral 78, and as expected from the circuit, it is sinusoidal in nature. The sweep circuit is triggered by the peaks of the wave forms. It is to be noted that each of the wave form peaks corresponds to a time when the mirror 32 has reached a position of maximum excursion, on each side of its oscillation. That is, each of the peaks corresponds to a time when the image of the indicium 68 is at a maximum excursion position on each side of the slit 40, so that the center of excursion of the scanned image is also at a position of maximum excursion with respect to the slit.

Figure 3:
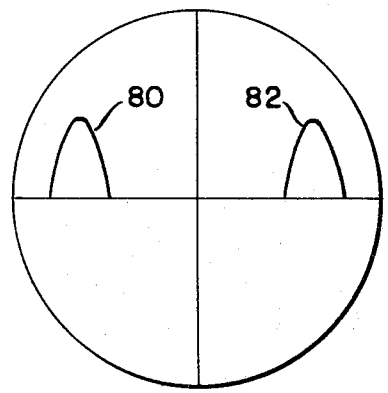
FIG. 3 is an illustration of the displays obtained from the apparatus, this figure showing the displays in an initial array.
Figure 4:
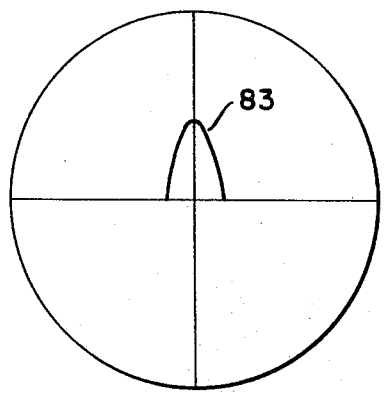
FIG. 4 is a view similar to FIG. 3, but showing the appearance of the displays when the indicium has been centered.

The operation of the apparatus is as follows:

The tuning fork 34 is energized in order to vibrate the mirror 32 and thus to cause the image falling on slit 40 to oscillate back and forth across the slit. At each half cycle of the tuning fork, the horizontal sweep on the oscilloscope is energized. The output of the phototube 44 is responsive to the light falling on the slit, and thus, as noted above, the phototube output varies as a function of the transmission of the area represented by the slit 40. This output appears as a vertical trace of the screen of the oscilloscope, and reference to FIGS. 3, 4 and 5 will illustrate the appearances of the traces under two conditions. In FIG. 3, the traces 80 and 82 are what is seen when the center of excursion of the image on the slit 40 is not centered in the slit. As the indicium 68 is moved by lead screw 66 (or other suitable means) to cause the center of excursion of the oscillated image to approach the center of the slit 40, it will be seen that the two traces 80 and 82 will move toward each other until finally they will coincide as indicated by the single trace 83 in FIG. 4. The coincidence of these two traces then indicates that the center of excursion of the oscillated image is at the center of slit 40. The position of the lead screw index mechanism at this point is noted, and by suitable means which are not part of this invention, the position may be fed to a computer. If, now, a second indicium (indicated by numeral 84 on the film) is moved into position, its position will eventually arrive at the point that its image is centered in the slit 40. The position (centered) of indicium 84 is noted on the lead screw index, and thus by comparison of the two positions, the separation between the two indicia is known.

Figure 5:
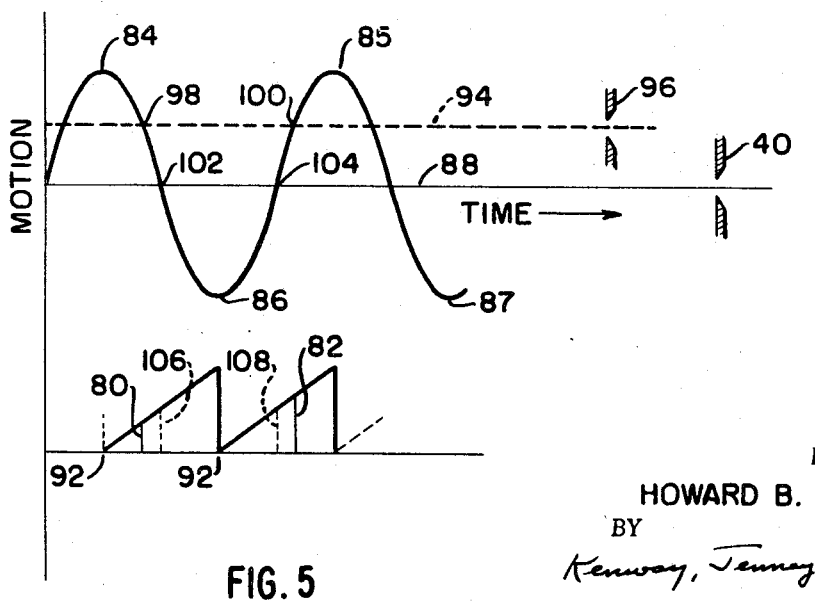
FIG. 5 is a diagram given to explain the principles of the invention.

The reason for the two traces appearing on the oscilloscope is explained by reference to FIG. 5. In the graph therein illustrated, the upper curve represents a plot of the motion of the image back and forth across the slit 40, the ordinate representing the movement of the image and the abscissa representing time. The lower graph is a plot of the sweep on the horizontal axis of the oscilloscope. Points 84 and 85 represent positions of the maximum excursion of the oscillating image on one side of the slit, and points 86 and 87 represent positions of maximum excursion of the image on the other side of the slit. Line 88 is a line representing the center of the slit when the center of excursion of the image is centered in the slit. The slit is drawn in full lines and indicated by numeral 40.

In the illustration, it will be noted that the sweep of the oscilloscope is triggered at points 92, these points occuring in sequence at the peaks of the swing of mirror, and thus at the peaks of the swing of the center of excursion of the image.

As the indicium 68 is moved by the lead screw to cause the center of excursion of the image to move in respect to the center of the slit, this occurrence may be illustrated in effect on the graph by moving the center of the slit to one side of the line 88 as shown by dotted line 94. Effectively, this new position is shown by the representation 96 of the slit 40.

It will now be observed that as the image passes from peak point 84 on its path of motion across the slit to peak point 86, the slit "sees" the image first at the point indicated by numeral 98. The trace 80 now appears on the oscilloscope screen in the position shown, since the horizontal sweep was triggered at the first (left) point 92. The image continues to move in the same direction across the slit until it reaches the point 86. It now commences to move back to its first position, that is, to point 85. However, when it reached the point 86, the horizontal sweep was again triggered. This time, it takes longer for the slit to "see" the image (from the time of triggering) and this occurs at point 100. At this point, the second trace 82 appears on the oscilloscope screen. It thus is apparent that the oscilloscope traces indicate the times taken by the center of excursion of the oscillating image to move from each of its two positions of maximum excursion to the slit. If, now, the indicium 68 is moved to bring the center of excursion closer to the actual center line of the slit, this effectively is the same as moving the line 94 closer to the line 88. As this happens, the points 98 and 100 move toward each other, and at a position of coincidence of the traces 80 and 82, the points where the slit 40 "sees" the image is indicated by numerals 102 and 104, the corresponding traces appearing equidistant between the points 92, as shown by the dotted lines 106, and 108, and the traces are in coincidence.

With the above described apparatus and its method of operation, it is to be noted that the positioning of the center excursion of the oscillated image on the center line of the slit is relatively independent of the position that the single trace 83 occupies on the oscilloscope screen. Also, if the profile of the density of the indicium 68 (or 84) is such that the top of the traces 80, 82 and 83 are fairly broad instead of being peaked, then the coincidence will be indicated by the coincidence of the edges of the profile rather than the peaks, thus providing accuracy regardless of the wave form.

A satisfactory machine has been constructed in which the various elements have the following characteristics and/or dimensions: the illumination for the optical system was provided by a lamp such as that manufactured by the General Electric Company, No. 1503, the lamp being operated from a direct current supply at 6 volts. The condensing lenses 8 were each of 76 millimeters focal length. The slit 10 was positioned approximately 1.281 inches from the nearest condensing lens, and approximately 5.250 inches from the mirror 12. Lens 14 is 50 millimeters in focal length with an aperture of f/2.8 and was placed at approximately 0.866 inch from the mirror 12. Film gate 16 was located approximately 2.6 inches from the lens 14, and the projection lens 18 was placed approximately 2.3 inches from the film gate. Lens 18 was 90 millimeters in focal length, and was placed approximately 3.6 inches from mirror 20. Dichroic element 22 was placed approximately 6 inches from the mirror 20. The distance from the dichroic element 22 to the mirror 28 was approximately 14 inches, and projection screen 30 was approximately 2.5 inches from the mirror 28. The mirror 32 was located approximately 2.2 inches from the dichroic element, and mirror 36 was approximately 8.6 inches from mirror 32. Mirrors 36 and 38 were placed at right angles, as illustrated, and their separation was approximately 2.28 inches. The slit 40 was placed approximately 3.7 inches from mirror 38. The photoelectric tube 44 was placed approximately 5.2 inches behind the slit 40, and the field lens 42 was of such focal length, and so positioned, as to focus the slit 40 on the phototube. (Obviously, the above characteristics can be changed to suit the manufacturer of the apparatus, since there are a number of combinations which will produce the correct images. Those given are merely exemplary.)

The photoelectric multiplier tube was Type 6199 made by Radio Corporation of America.

Tuning fork 34 was operated at a frequency of 400 cycles per second, and the angular motion of mirror 32 was approximately 5 milliradians. The slit 40 was approximately 300 microns in width, and the optical system had a magnification of 6, thus giving an effective slit width of 50 microns at the indicium 68, that is, at the film gate. The distance between positions of maximum excursion of the center of excursion of the image was greater than the width of the slit 40.

Mention has been made of the entrance slit 10. When the instrument is used for the position of, for example, X-ray diffraction spectra, there is no necessity of using the entrance slit, because the signal to noise ratio is great enough so that noise is ot a factor. However, in the use of this basic apparatus for the examination of spectra densities, an entrance aperture should be used in order to improve the signal to noise ratio by minimizing the transmission of scattered light through the system.

The power supply for the photomultiplier tube 44 is conventional, and well within the knowledge of the art. The oscilloscope 54 is also conventional, and has the above noted characteristics. The amplifier 50 has the above noted characteristics, and the one actually used was one made by the assignee of this application, GCA Corporation, Series 2000, 5 Decade.

Mirror 32 was a first surface aluminum mirror approximately 15 millimeters by 15 millimeters.

In the above description, it is pointed out that the indicium 68 is moved in order to move the center of excursion of the oscillating image with respect to the slit 40. Of course, it is possible to maintain the indicium 68 stationary and move the slit 40 instead. However, it was found in actual practice that moving the slit 40 and referencing the motion of that slit to the indicium position itself mechanically was not as suitable as maintaining the slit 40 stationary and moving the indicium.

It will be noted that the above apparatus is a single coordinate device, and there will now be described a plural coordinate apparatus utilizing the same basic principle.

Figure 6:
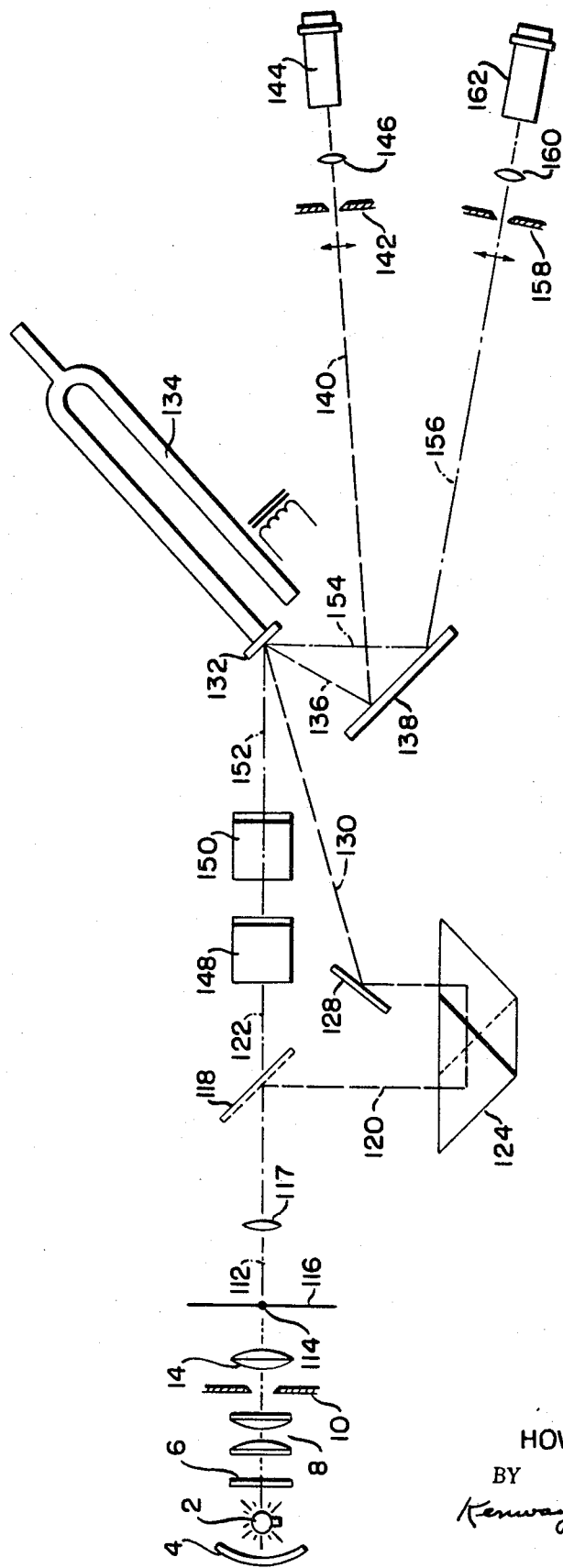
FIG. 6 is a schematic diagram of the optical system of a second embodiment of the invention.

Turning to FIG. 6, there is shown schematically an optical system for a two coordinate locating apparatus for a stellar image. Basically, the information beam (that is, the beam arising from the indicium being located) is split into two beams. One beam is rotated optically through 90° by the use of a pair of reflecting surfaces at 90° to each other and suitably oriented with respect to the direction of motion of the indicium in one coordinate. It is then directed to an oscillating (fork-mounted) mirror such as used in the FIG. 1 embodiment. From the oscillating mirror, the image of the indicum is directed to an exit slit, and the center of excursion of the oscillated image is centered in the slit using the principles set forth in embodiment 1. The other beam from the information beam is shifted into the same plane as the first, but without rotation, and is directed toward the same oscillating mirror but at a different angle of incidence. A second slit, lying in the same plane as the first slit, then receives an indicium image from this second beam. Each slit is followed by an appropriate photomultiplier tube such as shown in the FIG. 1 embodiment, and the respective outputs of these tubes are to the vertical deflection system of an oscilloscope.

In order to measure the density of the stellar image, the outputs of the photomultiplier tubes may each be fed through an amplifier (as in the FIG. 1 embodiment) which has a logarithmic characteristic.

The horizontal deflection sweep system of the oscilloscope is triggered, as in the FIG. 1 embodiment, by a portion of the signal of the oscillator driving the fork; but in the oscilloscope, means are provided so that, first, the output of one of the photomultiplier tubes is caused to present its pair of traces on the screen of the oscilloscope, and, then, the output of the other of the outputs presents its traces. The result of this is that four images will be displayed on the oscilloscope. Two of these displays corresponding to the wo displays shown in FIG. 3, and are associated with one of the two slits. The other pair of displays is associated with the other slit.

The rotating of the one beam 90°, makes possible the use of one oscillating reflective element, namely, the mirror. Thus, as contrasted to the use of two mirrors (which would be required without such rotation) there is eliminated the need for synchronizing the vibrations of the two mirrors and thus elimination of most, if not all, of the attendant difficulties encountered in the use of two mirrors. In addition, the use of a single fork and mirror combination reduces component costs, system bulk, and guarantees implicit phasing and amplitude of the two signals.

In this embodiment, the indicium is moved in two coordinates at right angles to each other. As drawn, motion of the indicium in a direction lying in the plane of the paper will cause the center of excursion of the image therefrom to traverse the slit in the plane of the paper. Motion of the indicium in the other cordinate, (that is, one perpendicular to the plane of the paper) will also cause (because of the 90° rotation) the image in this coordinate to traverse the slit which is also in the plane of the paper. (The axis of angular motion of the mirror is perpendicular to the plane of the paper.)

For rotation of one of the beams, a Porro prism is preferably used, as ilustrated, because Porro prisms are relatively inexpensive and readily available. Such a prism requires only two reflections to rotate the image through 90°, and it is therefore more efficient then, for example, a Pechan prism which uses 5 reflections. Of course, if desired a pair of front-surface mirrors inclined toward each other and to the directions of motion of the indicium, could be used instead of a prism.

In FIG. 6, a projection system for illuminating an indicium is used similar to that of the FIG. 1 embodiment, comprising a light 2, mirror 4, heat filter 6, condensing lenses 8, and an entrance aperture 10 and projection lens 14. Since these elements are the same as in the FIG. 1 embodiment, no further description will be given in regard to this second embodiment.

Beam 112 from an indicium 114 on film plate 116 is split into the two beams 120 and 122 by a beam splitter 118, the latter being of conventional nature such as a half-silver mirror. These two beams convey information regarding the position of the indicium as will now be described.

Beam 120 is at right angles to beam 122 by preference, and is directed to a pair of reflecting surfaces mounted at 90° to each other such as are provided, for example, by Porro prism 124. Prism 124 has its apex positioned at 45° to the plane which contains the coordinate axes along which the indicium 114 is to be located, one of these axes lying in the plane of the paper as viewed in FIG. 6 and the other axis being perpendicular to the plane of the paper. From the prism, beam 126 is directed by mirror 128 as beam 130 onto the oscillating mirror 132 which is mounted at the end of one tine of a tuning fork 134 similar in all respects to the tuning fork 34 of the first embodiment. From mirror 132 beam 130 is reflected as beam 136 to a reflecting surface 138 and thence as beam 140 to an exit slit 142. A photomultiplier tube 144 similar to photomultiplier tube 44 is placed on the other side of slit 142, with a suitable field lens 146 being interposed to focus the slit on the photomultiplier tube.

The other beam 122 is brought without optical rotation into the plane of beam 130 by means of the opposed reflecting surfaces 148 and 150, suitably aligned in conventional manner. The emergent beam 152 from the mirror 148 then strikes the oscillating mirror 132 at the same point of incidence as beam 130 but at a different angle of incidence. Beam 152 is reflected as beam 154 which falls on reflecting surface 138 and is reflected therefrom as beam 156. Beam 156 is brought to focus on slit 158. A suitable field lens 160 is positioned back of slit 158, and photomultiplier tube 162 is suitably positioned in respect to the field lens and slit so that the slit is brought to focus on the photomultiplier tube.

With the above construction, it is seen that when the indicium 114 is moved along the coordinate axis which lies in the plane of the paper, the motion of its image across slit 158 will lie in the plane of the paper. So also, as noted above, when the indicium 114 is moved on the coordinate axis which is perpendicular to the paper, the motion of its image across slit 142 will lie in the plane of the paper. The oscillating mirror 132 will oscillate these respective images across their respective images across their respective slits at the frequency of the tuning fork.

Figure 7:
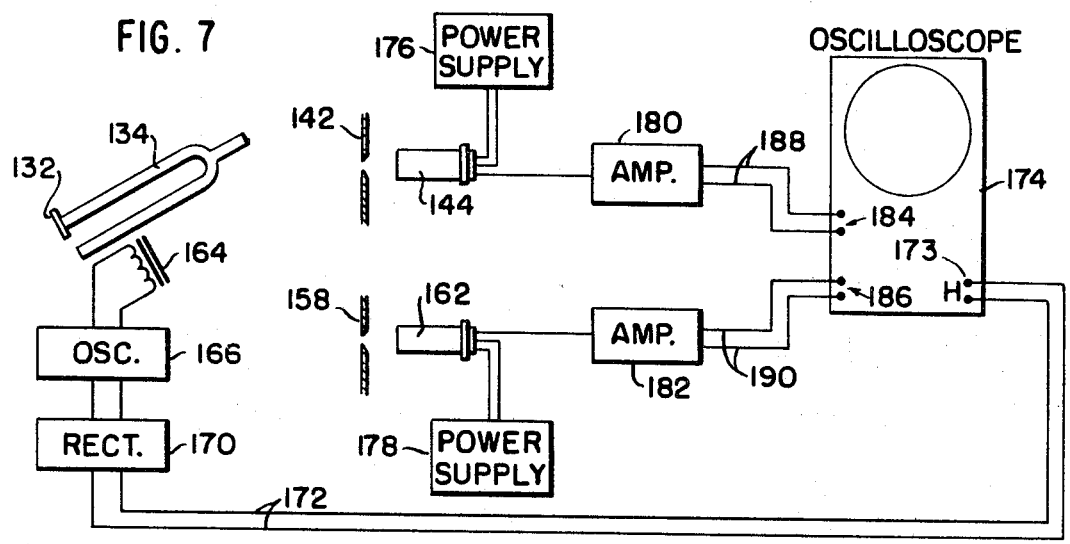
FIG. 7 is a schematic diagram of the electrical circuit of the FIG. 2 embodiment.

Referring to FIG. 7, there is shown schematically the electrical circuit for this second embodiment. In the drawing there is shown the tuning fork 134 and the mirror 132. An electromagnetic driver 164 is provided, as in the FIG. 1 embodiment, the power for which is derived from an oscillator 166 to drive the fork at its predetermined frequency. A part of the oscillator signal is fed by leads 168 to the full wave rectifier 170 like that described for the FIG. 1 embodiment. The signal output from the rectifier is applied by means of leads 172 to the horizontal sweep deflection terminals 173 of the oscilloscope 174.

The photomultiplier tubes 144 and 162 are shown associated with their slits 142 and 158, respectively. Each of the photomultiplier tubes is supplied by its high voltage power supply, respectively indicated by numerals 176 and 178. The electrical outputs are connected respectively to the amplifiers 180 and 182 which are similar to the amplifier 50 of the first embodiment.

Oscilloscope 174 is of the kind in which are provided dual vertical deflection means as represented by terminals 184 and 186 to which connections are made. The output of the amplifier 180 is applied by means of leads 188 to the vertical deflection means 184, and the output of amplifier 182 is applied by means of leads 190 to the other vertical deflection means 186.

In the oscilloscope, standard means are used to switch alternately the vertical deflection means 184 and 186 each time the horizontal sweep is triggered.

In the system as thus described, as in the FIG. 1 embodiment, the horizontal sweep of the scope is arranged to always sweep in one direction, and is triggered in this direction at each position of maximum excursion of the fork (and thus the mirror 132), that is, the horizontal sweep is triggered each time the images on the slits 142 and 158 reach their maximum excursion on each side of their respective slits. Since the vertical deflection means 184 and 186 are alternately energized at a time of a first triggering action, then traces will be obtained that represent the times taken for the images to move from positions of maximum excursion on one side of their respective slits, to the slits. A second triggering action will take place when these images reach their position of maximum excursion below the slits, and traces will appear representing the times from maximum excursion on the other sides of the slits, to the slits.

If desired, the internal switching of the vertical deflection means can be arranged so that vertical deflection means 184 first measures the aforesaid times for one slit, and then switching takes place so that deflection means 186 measures the times for the other slit. In either of these two methods of switching, no information is significantly lost by this sharing of time by the vertical deflections, in view of the speed of scanning, which is approximately 400 cycles per second.

Figure 8:
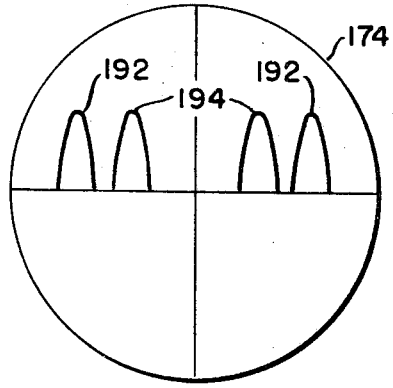
FIG. 8 is an illustration of the displays obtained from the FIG. 6 embodiment, this figure showing the displays in an initial array.
Figure 9:
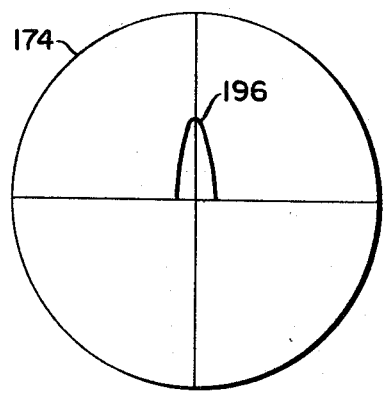
FIG. 9 is a view similar to FIG. 8, but showing the appearance of the displays when the indicium has been centered in its aperture.

Referring now to FIG. 8, there is illustrated a screen of a cathode ray tube as described in respect to oscilloscope 174, in which the spectral image is not centered with respect to the aperture 10. Traces 192 correspond, for example, to the information provided by exit slit 142, that is, the displacement of the indicium along one axis; and traces 194 correspond to displacement information in respect to slit 158, that is, along the other axis. Again, however, the same operating principle is observed in respect to these pairs of traces as is found in the pair of traces illustrated in respect to the first embodiment. The centering of the indicium in respect to the slits results in a single trace illustrated in FIG. 9 as trace 196, all of the pairs of traces coinciding when the center of excursion of each image is at the center of its respective slit. This, then, means that the indicium is at the intersection of the coordinate axes.

In operation, the lead screw which moves the photographic plate bearing the indicium along one axis is operated until the corresponding pair of traces coincide. Then the lead screw moving the indicium along the other coordinate axis is operated until the other pair of traces coincides. With complete coincidence of the four traces, and by suitable reference indexing relating the position of the exit slits 142 and 158 with the characteristics and indexing of the respective lead screws, the orthogonal coordinate location of the spectral image is obtained.

As in the FIG. 1 embodiment, instead of moving the indicium film plate 116 in each of the two directions, the slits 142 and 158 can be moved. The key is the relationship of the center of excursion of these scanning images with the centers of the slits. However, it has been experienced that movement of the slits instead of the single indicium plate is more difficult to do mechanically with precision than is the case when the photographic plate is moved.

It is to be noted that instead of the single oscilloscope 174, a pair of oscilloscopes may be used, each oscilloscope deriving its information from the respective amplifier associated with a slit. In this case, the images displayed will be similar to those of the FIG. 1 embodiment (for each oscilloscope) and thus each pair of traces is to be coincided for centering. In some instances this may be advantageous to do rather than using the single oscilloscope. However, regardless of whether a single oscilloscope is used or a plurality of oscilloscopes, the principle used in regard to the two coordinate locating means is that of using a single scanning means which in this instance is the vibrating mirror, instead of using a plurality of scanning means which will need to be synchronized, as well as being more costly.

In this second embodiment, the optical characteristics of the various lenses and mirrors have not been given, because they are within the skill of the art to determine, particularly, since such optical details are given by way of example in reference to the FIG. 1 embodiment. It is to be noted that the position of angle of the mirrors 148 and 150 may be adjusted in order to parfocalize the optical path lengths from the beam splitter 118 to the oscillating mirror of each half of the beams 120 and 122.

Other means, of course, may be utilized to parfocalize these beams, such as, for example, by adjusting the prism 124 and the mirror 128. Other means are within the skill of the art.

The invention has thus far been described and illustrated in connection with the read-out of the phototube being done by an oscilloscope. However, as mentioned above, the invention is readily adaptable to automatic operation, and reference to FIG. 10 and the following description will illustrate such a system schematically.

Figure 10:
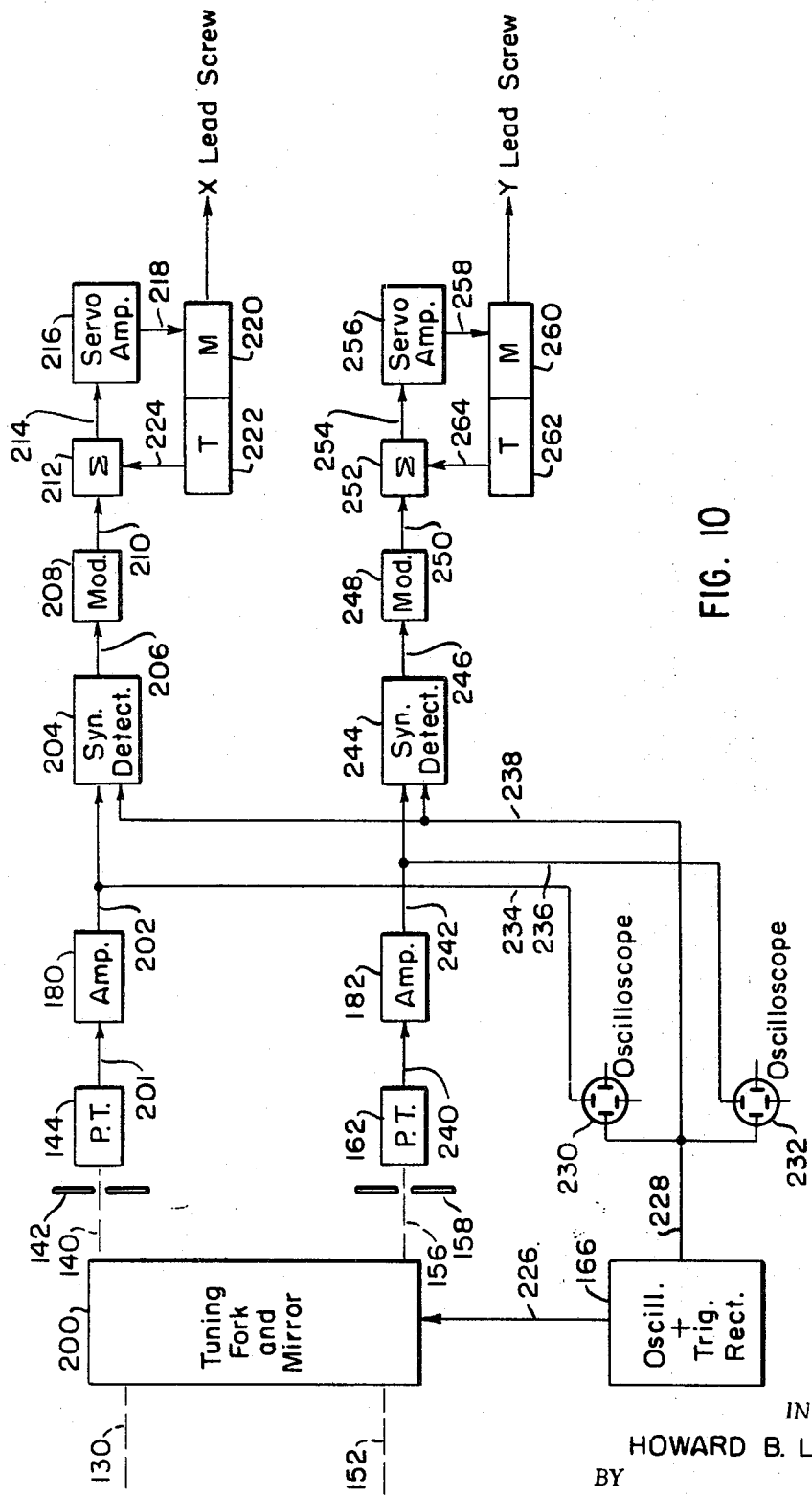
FIG. 10 is a schematic diagram of a system using the invention.

Referring, then, to FIG. 10, which is a block diagram of a fully mechanized system, block 200 indicates the tuning fork with its mirror and the electromagnetic driving coil for the tuning fork. Indicated by broken lines 130 and 152 are the two beams of light referred to in the FIG. 6 embodiment, each of these beams striking (as described for said embodiment) the mirror mounted on the tuning fork. These beams reflect from the mirror as shown by broken lines 140 and 156, emergent beam 140 reaching slit 142, and beam 156 reaching slit 158. The output of phototube 144 is fed to the amplifier 180 by lead 201, and that from phototube 162 is fed to the amplifier 182 by lead 204. (Throughout the drawing, conventional circuit diagraming is shown, i.e., only one of the electrical leads is shown, it being within the skill of the art to provide the other power connection either through a ground or through another lead.)

From amplifier 180 of the kind described for the first two embodiments, the signal is fed by means of lead 202 to a phase synchronism detector 204, the latter being known in the art and preferably one giving a null reading when the compared phases are equal. The output of detector 204 is fed by lead 206 to a modulator 208 and thence by lead 210 to a summation device 212. From device 212, the signal passes via lead 214 to a servo-amplifier 216. From the servo-amplifier, the signal is fed via lead 218 to a servo-motor 220, the mechanical output of which is connected to the lead screw for moving the indicium in the X-axis.

In a manner well known in the servomechanism art, a tachometer 222 has its output fed, via lead 224, back to the summation device 212.

The function of the summation device 212 is to maintain the torque of the servo-motor 220 at a high level up to the point of null signal.

Oscillator 166 is provided as in the previous embodiments and is connected by lead 226 to the electromechanical driving coil for the tuning fork. (Block 166 is to be taken as being schematically representative of the oscillator and triggering rectifier 170 of the previous embodiments.) From rectifier 170, the triggering impulse is fed by lead 228 to the horizontal deflection plates (sweep-circuits) of the oscilloscopes 230 and 232.

The vertical deflection means of the oscilloscope 230 are connected by means of lead 234 to lead 202, and thus to the phase synchronism detector 204. The output of the triggering full-wave rectifier 170 is further connected by means of lead 238 to the phase synchronism detector 204.

In similar fashion, the output of photoelectric multiplier tube 162 is connected by means of lead 240 to the amplifier 182 which is similar to amplifier 180, the output of which is connected by means of lead 242 to the phase synchronism detector 244 which is similar to the detector 204. The signal from detector 244 is fed via lead 246 to the modulator 248 which is similar to modulator 208. The output of modulator 248 is fed via lead 250 to the summation device 252 which is similar to summation device 212. The output of device 252 is fed via lead 254 to the servo-amplifier 256, the output from which is fed via lead 258 to the servo-motor 260. Attached to the servo-motor in conventional manner is the tachometer 262, the output of which is fed via lead 264 to the summation device 252.

Leads 228 and 238 also couple the output of the triggering rectifier 170 to the synchronism detector 244. The vertical deflection means of oscilloscope 232 are coupled by means of lead 236 to lead 242 and thus to the output of amplifier 182 and to the phase synchronism detector 244.

The output of the servo-motor 260 operates the lead screw for moving the indicium in the Y-axis.

The operation of the apparatus of this embodiment is as follows in this description, only one of the circuits, that following detector 204, will be described since the operation of the similar circuit, that following detector 204, is the same.

Through the amplifier 180, the operation is the same as described for the FIGS. 1 and 6 embodiments. Thereafter, phase synchronism detector 204, when activated by the triggering impulse from device 170, compares the phases of the signals received from the phototube 144 each time that the oscillating image traverses the slit 142. As long as these phases are different, the detector 204 produces a signal which is fed to the modulator. The function of the modulator 208 is to convert the frequency at which the tuning fork is driven to the frequency at which the servo-motor 220 operates. (For convenience, servo-motors were used which operate at a frequency of 60 cycles, and the tuning forks, as indicated above, were operated at a frequency of 400 cycles.)

The signal from the detector 204 is amplified by the servo-amplifier 216 which amplifies the signal derived from the phase difference and feeds it to the servo-motor. As long as there is a signal from the detector 204, then the servo-motor 220 will operate in order to advance or retract the lead screw for the X-axis, which in turn moves the indicium. As the indicium moves, the center of excursion of the oscillated image will approach the center of the aperture; and as the latter occurs, the phase difference between the aforesaid signals from the photomultiplier tube 144 approaches zero. When the final null-point is reached, indexing by the servo-motor ceases, and at this position, the center of excursion of the image will be centered in its respect aperture (in this case aperture 142).

The operation of the parallel circuit for the Y-axis lead screw, from photomultiplier tube 162 through servo-motor 260, is the same as that described for the circuit from photomultiplier tube 144.

In the above circuit, the oscilloscopes 230 and 232 are provided in order to get a visual read-out of positioning of the images in their apertures, while the automatic positioning of those images is being obtained by the operation of the servo-motors 220 and 260.

If desired, hand or manual adjustments of the respective lead screws may be provided following conventional mechanical linkages and switching apparatus. Such manual positioning is desirable, although not necessary, in order to position initially the indicium near the point where the oscillated image has its center of excursion near the center of the aperture in order to save time in getting a final adjustment. Also, the mechanical adjustment may be used in order to establish a first bench mark or basic position to which the position of the indicium is to be related automatically by the servo-mechanism means.

In view of the above it will be seen that the several objects of the invention are achieved and other advantageous results attained.

It is to be understood that the invention is not limited in its application to the details of construction and arrangement of parts illustrated in the accompanying drawings, nor to the methods described, since the invention is capable of other embodiments and of being practiced or carried out in various ways. Also, it is to be understood that the phraseology employed herein is for the purpose of description and not of limitation.

As many changes could be made in the above constructions and methods without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. Apparatus for determining the position of an indicium in two directions at an angle to each other comprising:
   means for illuminating the indicium;
   means for splitting a first beam of light from the indicium into a second beam and a third beam;
   means for rotating the third beam at an angle equal to the angle between said two directions;
   means for moving the indicium in one of said directions in a plane perpendicular to the direction of said first beam;
   means for moving the indicium in the other of said two directions and in a plane perpendicular to the direction of said first beam;
   first and second apertures;
   means for forming a pair of images of the indicium one from each of said second and third beams, one image occurring at the first aperture and the other occurring at the second aperture;
   single means for oscillating each of the images across its respective aperture at a predetermined frequency, the centers of excursions of each oscillated image moving across its respective aperture as the indicium is moved in one of said directions for one aperture and in the other of said directions for the other aperture, each of the oscillated images having positions of maximum excursion one on each side of the respective aperture;
   first and second light responsive means positioned to receive light respectively from said first and second apertures, each of said light responsive means having an output across which appears a pair of electrical signals as the respective image traverses its aperture at successive times;
   means for timing the appearance of the signals of each pair thereof as measured from positions of maximum excursion of the respective image whereby the phrases of the signals of a respective pair thereof are different when the center of excursion of the respective image is displaced from the center of its aperture but are the same when said center of excursion is at said center; and
   means coupled to the light responsive means for comparing the phases of each pair of signals, said last named means being adapted to indicate equality of the phases of the signals from one light responsive means, and equality of the phases of the signals from the other light responsive means.

2. The apparatus of claim 1 in which said two directions are at 90° to each other, and said means for rotating said third beam is a pair of reflective surfaces whose planes are at right angles to each other, a plane perpendicular to the line where said surfaces meet in an apex being inclined at an angle of 45° to the plane containing said two directions.

3. The apparatus of claim 1 in which said means for oscillating the images is a vibrating mirror.

4. The apparatus of claim 3 in which said mirror is mounted on a vibratable tuning fork.

5. The apparatus of claim 1 in which the means coupled to the light responsive means comprises a phase synchronism detector, each light responsive means being coupled to a separate phase synchronism detector.

6. The apparatus of claim 1 in which said means coupled to each of said light responsive means for comparing the respective pairs of phases comprises a display device producing two displays from each light responsive means, one display corresponding to a transversal as the respective image across its aperture in one direction, and the other display corresponding to a transversal of the same image across its aperture in an opposite direction, the positions of said displays as measured from a fixed reference point representing the times required by said center of excursion of the respective image to move to its aperture from its maximum excursion positions, said positions, when coincident, indicating that said center of excursion of the respective image is at the center of its aperture.

7. The apparatus of claim 6 in which said display device comprises an oscilloscope having vertical and horizontal deflection means and said timing means includes a triggering means coupled to the horizontal deflection means the triggering means being energized each time the image reaches a position of maximum excursion; the horizontal deflection means being adapted to sweep the cathode ray of the oscilloscope along the horizontal axis always in the same direction and in a time equal to the time of one-half cycle of said oscillating means, and means for alternately coupling said vertical deflection means to each of said light responsive means, whereby two pairs of displays are produced on the screen of the oscilloscope, one pair of displays being associated with said first image and the other pair of displays being associated with said second image, each pair of displays representing the times required by the center of excursion of its respective image to move to its aperture from its maximum excursion position on each side thereof, the displays of each of said pairs coinciding when said times are equal.

8. The apparatus of claim 7 in which said indicium is a photographic image, and including an amplifier having an input-output characteristic which is logarithmic, said vertical deflection means being coupled to the light responsive means through the amplifier, whereby at least one of the pair of displays which is produced through said amplifier is approximately a linear measure of the density of said photographic image.

References Cited

UNITED STATES PATENTS

| | | | |
|---|---|---|---|
| 2,764,909 | 10/1956 | Caldecourt et al. | 250—235 X |
| 3,038,077 | 6/1962 | Gillespie et al. | 250—235 X |
| 3,154,626 | 10/1964 | Sisson | 250—203 X |
| 3,244,886 | 4/1966 | Zuckerbraun | 250—232 X |

FOREIGN PATENTS

| | | |
|---|---|---|
| 684,435 | 12/1952 | Great Britain. |

OTHER REFERENCES

Haas Hallows: The Oscilloscope at Work, 1954 pp. 19–20.

RONALD L. WIBERT, Primary Examiner

T. MAJOR, Assistant Examiner

U.S. Cl. X.R.

250—235; 356—164, 170, 171

UNITED STATES PATENT OFFICE
CERTIFICATE OF CORRECTION

Patent No. 3,540,831      Dated November 17, 1970

Inventor(s) Howard B. Lovering

It is certified that error appears in the above-identified patent and that said Letters Patent are hereby corrected as shown below:

In the claims, column 13, claim 1, line 41 should read as follows:

excursion of the respective image whereby the phases

In the claims, column 14, claim 6, line 5 should read as follows:

sponsive means, one display corresponding to a tra-

In the claims, column 14, claim 6, line 7 should read as follows:

direction, and the other display corresponding to a tra-

SIGNED AND
SEALED
MAR 2 1971

(SEAL)
Attest:

Edward M. Fletcher, Jr.
Attesting Officer

WILLIAM E. SCHUYLER, JR.
Commissioner of Patents